(12) United States Patent
Wang et al.

(10) Patent No.: US 9,491,270 B1
(45) Date of Patent: Nov. 8, 2016

(54) METHOD AND APPARATUS FOR MUTING AN AUDIO OUTPUT INTERFACE OF A PORTABLE COMMUNICATIONS DEVICE

(71) Applicant: MOTOROLA SOLUTIONS, INC., Schaumburg, IL (US)

(72) Inventors: Jun Seng Wang, Perak (MY); Mohd Wardi Iswali Aihsan, Kedah (MY); Chee Kit Chan, Perak (MY); Shirish Kaner, Penang (MY); Ye Gen Koh, Johor Bahru (MY); Toymuan Yoong, Georgetown (MY)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 14/941,036

(22) Filed: Nov. 13, 2015

(51) Int. Cl.
*H04M 1/02* (2006.01)
*G06F 3/16* (2006.01)
*G10L 15/26* (2006.01)
*G06F 1/16* (2006.01)
*G06F 1/26* (2006.01)

(52) U.S. Cl.
CPC .......... *H04M 1/0245* (2013.01); *G06F 1/1624* (2013.01); *G06F 1/26* (2013.01); *G06F 3/165* (2013.01); *G10L 15/26* (2013.01); *H04M 1/0237* (2013.01); *H04M 1/0266* (2013.01)

(58) Field of Classification Search
CPC .......... H04M 1/0237; H04M 1/0245; H04M 1/0266; G06F 1/1624; G06F 1/26; G06F 3/165; G10L 15/26
USPC ............. 455/575.4, 566; 379/433.04, 433.12
See application file for complete search history.

(56) References Cited

U.S. PATENT DOCUMENTS

| 5,555,064 | A | 9/1996 | Machida |
| 7,688,375 | B2 | 3/2010 | Ho |
| 8,089,389 | B2 | 1/2012 | McRae |
| 2005/0233777 | A1 | 10/2005 | Twerdahl |

*Primary Examiner* — Raymond Dean
(74) *Attorney, Agent, or Firm* — Michael Best & Friedrich LLP

(57) ABSTRACT

A portable communications device having a panel movable between a first position and a second position, a receiver to receive incoming audio messages, a memory and an electronic processor. The electronic processor determines whether the panel is in a first position or a second position. The electronic processor converts an audio portion of the incoming audio message to a visual message and displays the visual message on a display of the portable communications device.

19 Claims, 7 Drawing Sheets

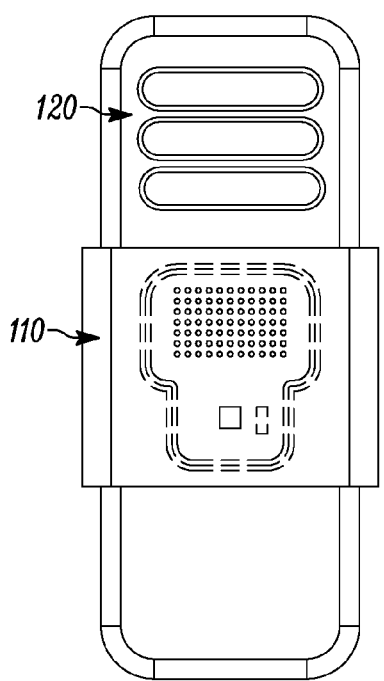
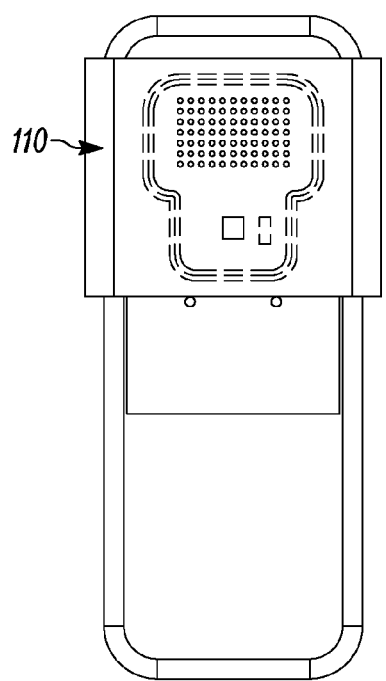
FIG. 2A  FIG. 2B
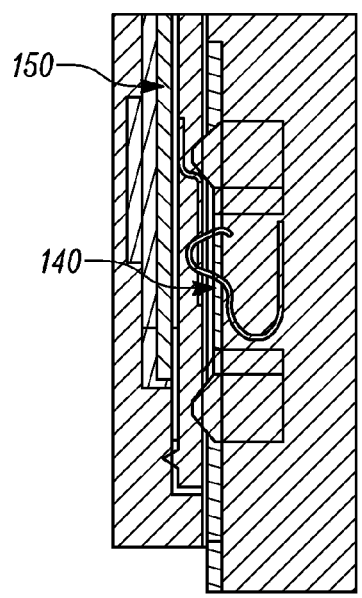
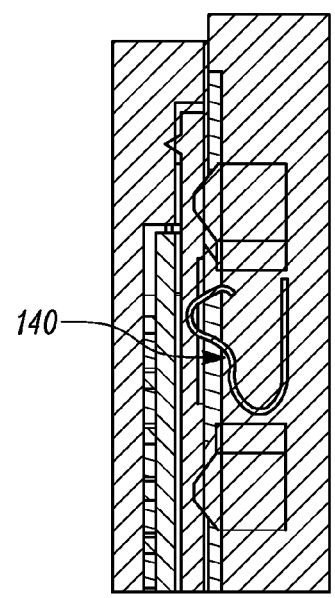
FIG. 2C  FIG. 2D

METHOD AND APPARATUS FOR MUTING AN AUDIO OUTPUT INTERFACE OF A PORTABLE COMMUNICATIONS DEVICE

BACKGROUND OF THE INVENTION

Portable communications devices, such as radios and mobile telephones, have features that allow users to mute an audio output interface of the portable communications device (e.g., a speaker). For example, a portable communications device may include a toggle switch or a rotational switch that selectively mutes an audio output interface of the portable communications device. Generally, these switches are located in inconspicuous locations on the portable communications device. Therefore, in some situations, a user of a portable communications device is unaware that the audio output interface is muted.

Once an audio output interface is muted, audio messages (e.g., telephone calls or push-to-talk calls) received by the portable communications device are not output through an audio output interface. However, in certain situations, the user of the portable communications device may need to receive the audio messages even if the audio output interface is muted. For example, users in a supervisory role may need to mute an audio output interface of their portable communications device when attending meetings. However, the user may still desire to receive messages transmitted to the user's portable communications device.

Accordingly, there is a need for a method and apparatus for muting an audio output interface of a portable communications device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 2A and 2B illustrate different positions of the panel of FIGS. 1A and 1B in accordance with some embodiments.

FIGS. 2C and 2D are cross-sectional views of the portable communications device of FIGS. 1A and 1B in accordance with some embodiments.

Figure 1B:
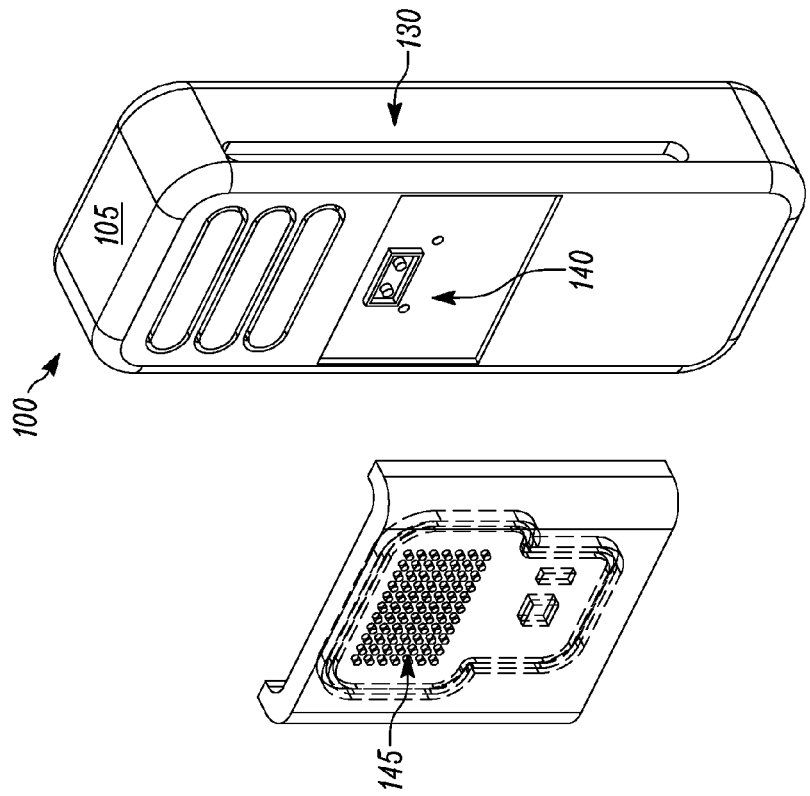
FIGS. 1A and 1B illustrate a portable communications device having a panel in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of muting an audio interface of a portable communications device having a panel movable between a first position and a second position. The method includes receiving an audio message and determining whether the panel is in the first position or the second position. The method further includes converting an audio portion of the audio message to a visual message with an electronic processor when the panel is in the second position. The method also includes displaying the visual message on a display of the panel.

Another embodiment provides a portable communications device including a panel having a display, where the panel is movable between a first position and a second position, a receiver to receive an incoming audio message, a processor, and a memory. The memory stores instructions that, when executed by the processor, perform a set of functions. The set of functions includes determining whether the panel is in a first or a second position. The set of functions further includes converting an audio portion of the incoming audio message to a visual message when the panel is in the second position. The set of functions also includes displaying the visual message on the display of the panel.

Figure 1A:
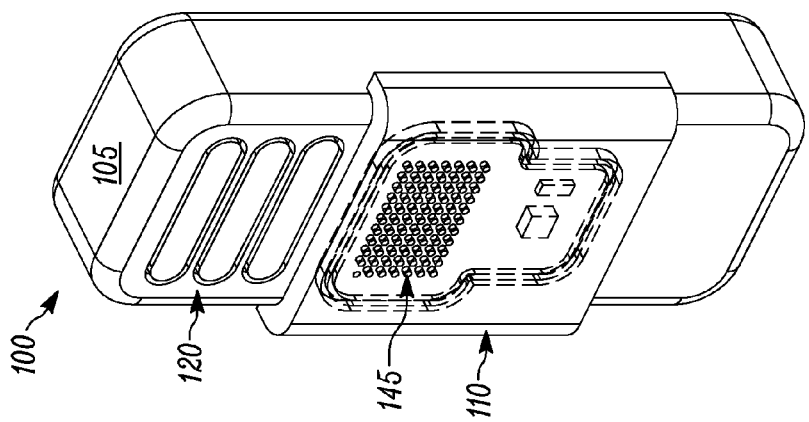

Another embodiment provides a method of outputting an incoming audio message received at portable communications device. The method includes receiving the incoming audio message. The method further includes determining whether a panel of the portable communications device is in a first position or a second position. The method also includes while the panel is in the first position, playing audio data of the incoming audio message through an audio output interface of the portable communications devices. The method further includes while the panel is in the second position, converting audio data of the incoming audio message to a visual message and displaying the visual message on the display FIG. 1A illustrates a portable communications device 100. The portable communications device 100 includes a housing 105, a panel 110, and an audio output interface 120, such as a speaker. As illustrated in FIG. 1B, the housing 105 includes a sliding rail system 130 and a contact 140. The sliding rail system 130 facilitates movement of the panel 110 from one position to another with respect to the housing 105 (for example, from a first position to a second position). Although the portable communications device is shown with the sliding rail system 130, persons skilled in the art will recognize that the sliding rail system 130 contemplates only an exemplary mechanism for moving the panel 110 from one position to another. Other embodiments may include other systems or mechanisms for moving the panel 110 from one position to another.

As described in more detail below, when the panel 110 is in the first position (see FIG. 2A), the audio output interface 120 of the portable communications device 100 is unmuted, and when the panel 110 is in the second position (see FIG.

2B), the audio output interface 120 is muted. When the audio output interface 120 is muted, the audio output interface 120 does not output (e.g., play) a received audio message (e.g., a voice call, such as a push-to-talk call or telephone call). In some embodiments, the panel 110 also includes a display 145, such as a light emitting diode (LED) display or any alternative display.

In some embodiments, the electrical components of the panel 110 (e.g., the display 145) receive electrical power from a power source of the portable communications device 100 (e.g., an internal battery) through a contact 140. As such, the contact 140 acts as a source of power to the panel 110. In certain embodiments, the electrical components of the panel 110 receive power only when the panel 110 is in the second position. In these embodiments, the panel 110 comes into contact with the contact 140 when the panel 110 is in the second position.

For example, as illustrated in FIG. 2C (illustrating a cross-sectional view of the contact 140 with the panel 110 in the second position), the panel 110 includes an inner contact 150. In certain embodiments, the inner contact 150 is molded with the panel 110. When the panel 110 is in the second position, the inner contact 150 is in contact with the contact 140 thereby forming a closed loop to conduct electricity from the contact 140 to electrical components of the panel 110.

Conversely, as illustrated in FIG. 2D (illustrating a cross-sectional view of the contact 140 with the panel 110 in the first position), when the panel 110 is in the first position, the inner contact 150 is not in contact with the contact 140. The electrical components of the panel 110, therefore, do not receive electrical power from the contact 140 when in this position. It should also be understood that, in some embodiments, the electrical components of the panel 110 receive electrical power through a power source included in the panel 110.

As illustrated in FIG. 2B, when the panel 110 is in the second position, the panel 110 at least partially covers the audio output interface 120. Accordingly, it is visibly easy to determine whether the audio output interface 120 is muted by determining whether the panel 110 is covering the audio output interface 120.

Figure 3A:
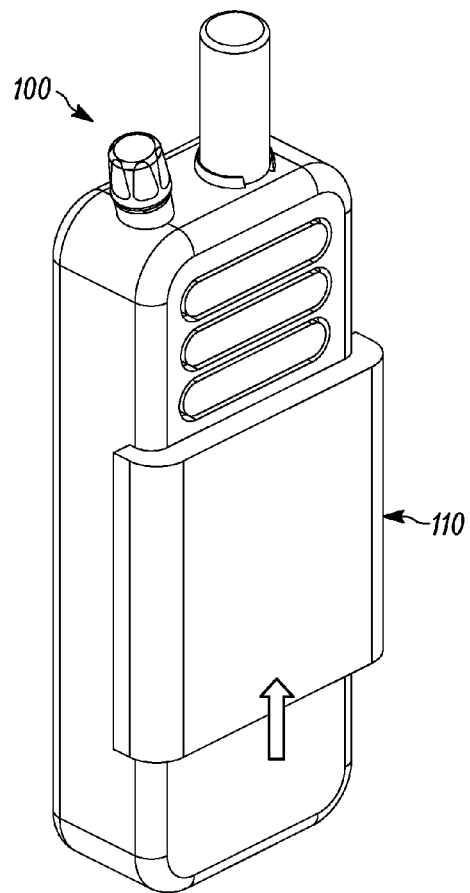
FIGS. 3A and 3B illustrate a display included on the panel of FIGS. 1A and 1B in accordance with some embodiments.
Figure 3B:
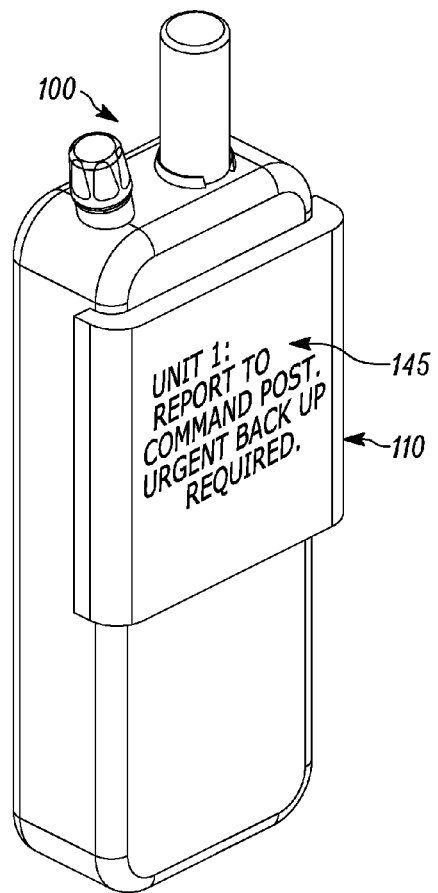

FIGS. 3A and 3B illustrate the display 145 included in the panel 110. In some embodiments, the display 145 is only activated when the panel 110 is in the second position (i.e., when the audio output interface 120 of the portable communications device 100 is muted). For example, when the panel 110 is in the first position (see FIG. 3A), the display 145 may not output any data (and may not receive electrical power through the contact 140). However, when the panel 110 is in the second position and the portable communications device 100 receives an audio message, the audio portion of the message may be converted to a visual message (for example, a text message) and displayed on the display 145 (see FIG. 3B). In some embodiments, the visual message is a canned message. In other embodiments, the visual message is a voice-to-text conversion of the audio message. Various known techniques of converting audio data to visual data may be used to convert the audio portion of a message to a visual message.

Figure 4:
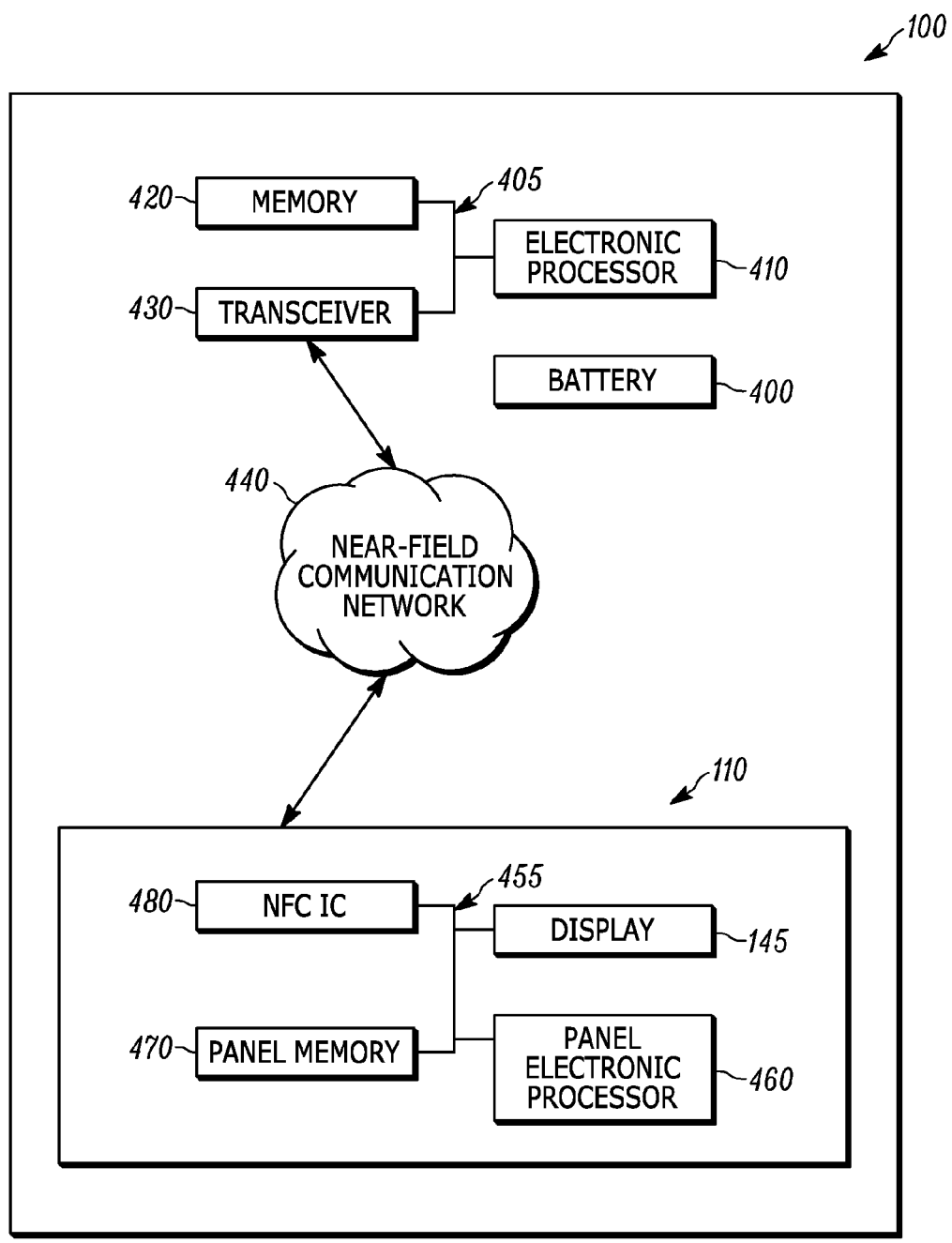
FIG. 4 is a block diagram of a portable communications device having a panel with a display in accordance with some embodiments.

FIG. 4 is a block diagram of the portable communications device 100. As illustrated in FIG. 4, the portable communications device 100 includes a power source 400 (e.g., a battery) and the panel 110. The portable communications device 100 also includes an electronic processor 410, a memory 420, and a transceiver 430. The panel 110 includes a panel electronic processor 460, a panel memory 470, a near-field communication integrated circuit (NFC IC) 480, and the display 145. It should be understood that the portable communications device 100 may include more or less components in some embodiments.

The electronic processor 410, memory 420 and transceiver 430 communicate over a wired or wireless communication bus 405. The memory 420 is a non-transitory memory that stores instructions that are received and executed by the electronic processor 410 to carry out the functionality of the portable communications device 100 described herein. The transceiver 430 receives messages (e.g., voice calls) from external communications devices, such as other portable communications devices. The transceiver 430 receives the messages over a wireless communication network, such as a radio network or a cellular network. In some embodiments, the transceiver 430 is also configured to transmit data over a near-field communication network 440, such as a Bluetooth® or Wi-Fi™ network. Alternatively or in addition, the electronic processor 410 is configured to transmit data over the near-field communication network 440 (e.g., using a near-field integrated circuit). The near-field communication network 440 transmits data between the electronic processor 410 and components of the panel 110. Alternatively or in addition, the electronic processor 410 communicates with components of the panel 110 over a wired connection.

The panel electronic processor 460, panel memory 470, near-field communication integrated circuit 480 and LED display 490 communicate over a wired or wireless communication bus 455. The panel memory 470 is a non-transitory memory that stores instructions that are received and executed by the panel electronic processor 460 to carry out the functionality of the panel 110 described herein. As described in more detail below, the panel memory 470 may also be used to store messages to be displayed on the display 145.

Before discussing additional details of the portable communications device 100, it is useful to note that numerous traditional portable communications devices do not retain (e.g., store) a received audio message (e.g., for future playback) when the audio output interface is muted. Often, when the audio output interface is muted, a traditional portable communications device discards the audio message (e.g., without saving the message), which means that the user cannot receive (e.g., play) missed messages at a later time. However, there are instances where future playback would be useful. For example, emergency responders may need to mute the audio output interface of their portable communications device when participating in covert operations, but they may still need to receive instructions from a base command station. However, when the responder's audio output interface is muted, the responder will not only miss the messages but also will not be able to play the messages at a later time.

In some embodiments of the portable communications device 100, the panel memory 470 may act as a message buffer for storing audio messages converted to visual messages (e.g., text). In some embodiments, visual messages are stored in the panel memory 470 until retrieved in response to user input received through the portable communications device 100. In other embodiments, the audio messages or visual messages may be stored on the memory 420 or a second memory of the portable communications device 100.

The near-field communication integrated circuit 480 employs near-field communication technologies, such as Bluetooth®, to receive data from the electronic processor 410 of the portable communications device 100. For example, as described in more detail below, in some embodiments, the near-field communication integrated circuit 480 receives an audio message from the electronic processor 410, which the panel electronic processor 460 converts into a visual message (e.g., text) and displays on the display 145. In other embodiments, the audio message is converted to a visual message (e.g., text) by the electronic processor 410 of the portable communications device 100 and the visual message is transmitted to the panel electronic processor 460 (for display on the display 145).

Figure 5:
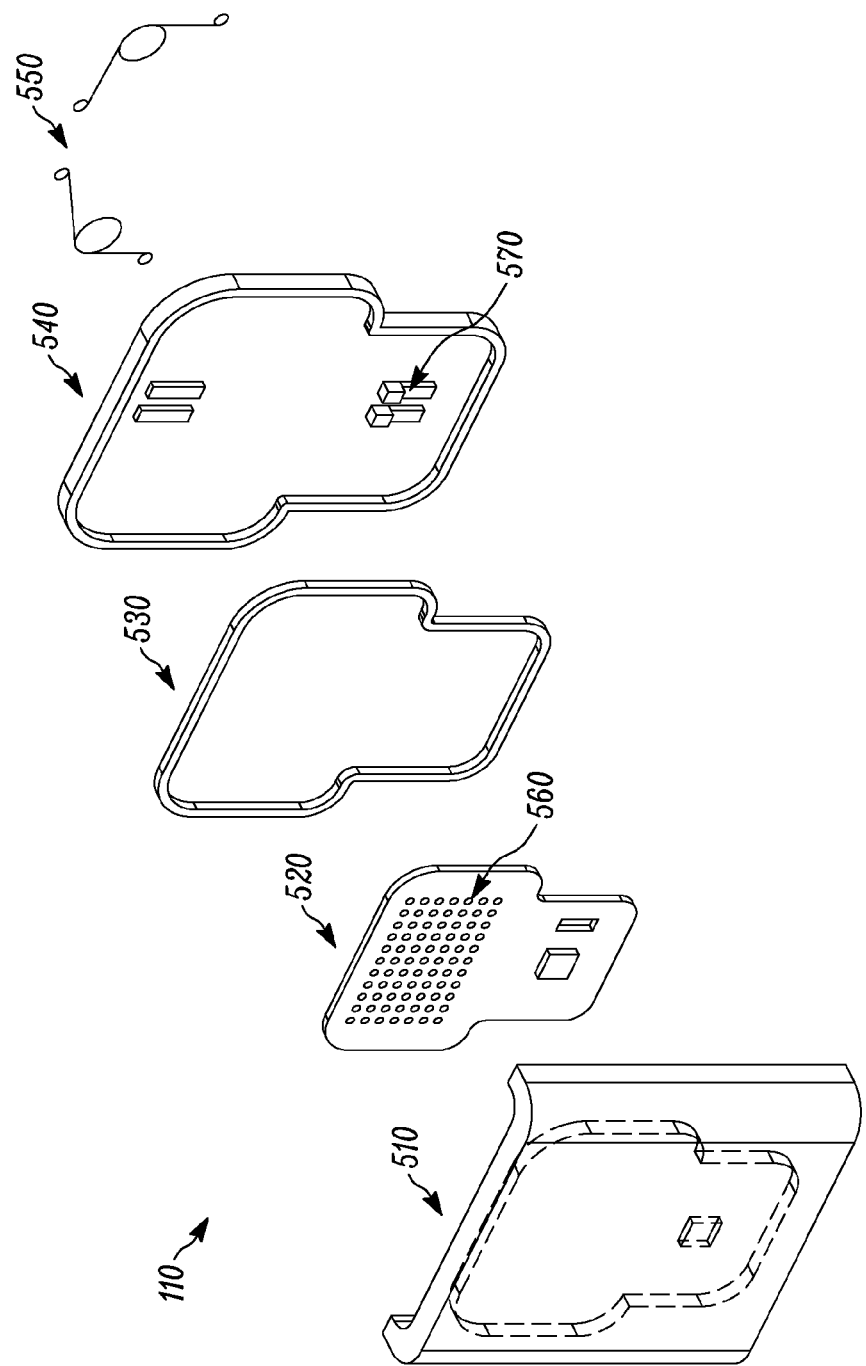
FIG. 5 is an exploded view of the panel of FIGS. 1A and 1B in accordance with some embodiments.

FIG. 5 is an exploded view of one exemplary embodiment of the panel 110. The panel 110 has a front cover 510, a printed circuit board (PCB) assembly 520, an adhesive seal 530, a back cover 540, and torsion spring 550. The front cover 510 provides structural support for the printed circuit board assembly 520.

The printed circuit board assembly 520 is coupled to the display 145. For example, in some embodiments, the printed circuit board assembly 520 includes surface-mounted light-emitting diodes (LEDs) to form the display 145. Other display technologies may also be used in place of the light emitting diodes, such as organic light-emitting diodes (OLEDs), a liquid crystal display (LCD), and the like). In some embodiments, the printed circuit board assembly 520 also includes the panel electronic processor 460, the panel memory 470, and the near-field communication integrated circuit 480 (see FIG. 1C) as described above. The adhesive seal 530 bonds the front cover 510 to the back cover 540 and provides sealing and dust ingression protection. The torsion spring 550 maintains the panel 110 in either the first or second position. The back cover 540 also includes the inner contact 150 as described above.

Figure 6:
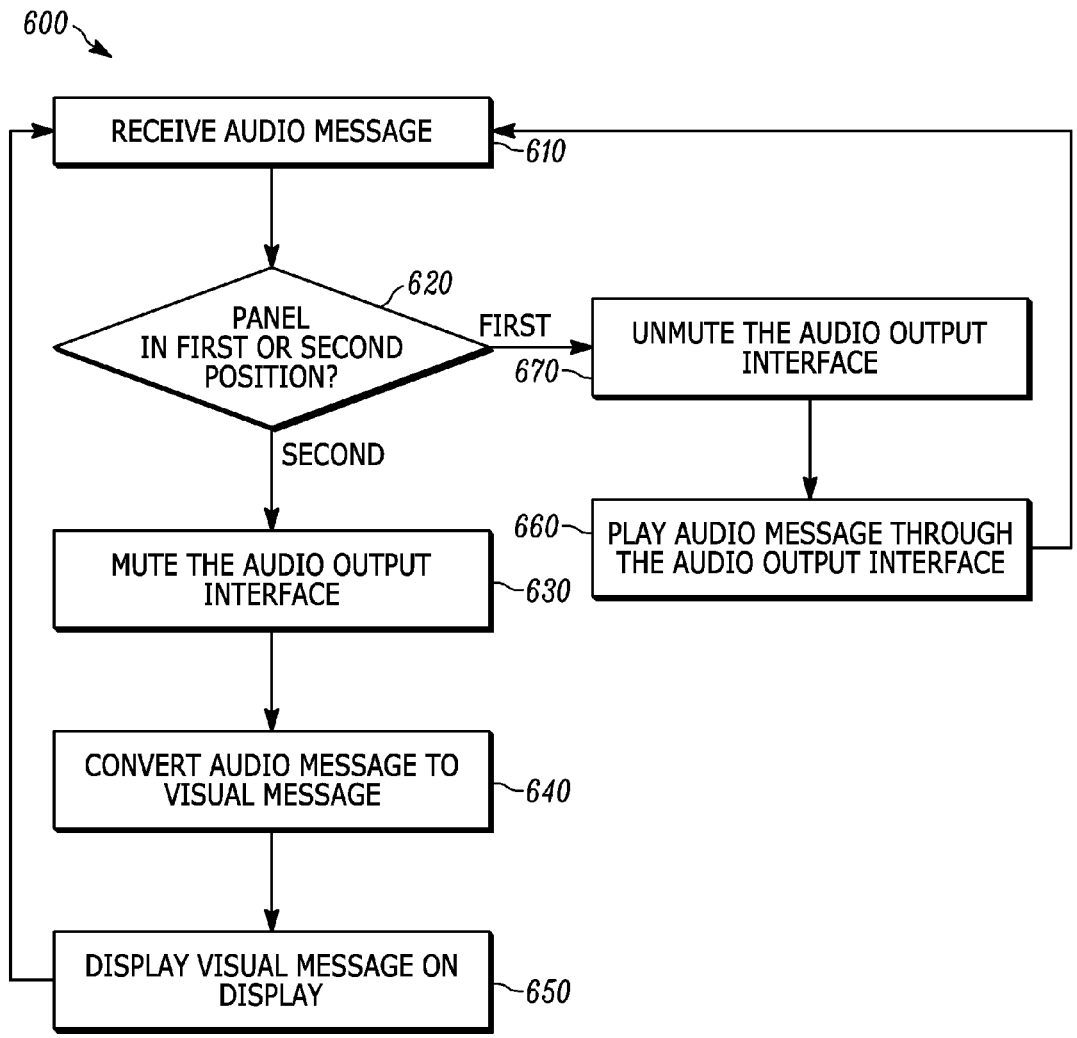
FIG. 6 is a flowchart illustrating a method of muting a portable communications device in accordance with some embodiments.

FIG. 6 is a flowchart illustrating a method 600 for muting the portable communications device 100. Although the method 600 is described in conjunction with the portable communications device 100, the method 600 could be used with other systems or devices. In addition, the method 600 may be modified or performed differently than the specific example provided.

The method 600 is performed by the portable communications device 100 (i.e., the electronic processor 410, the panel electronic processor 460, or a combination thereof). It should also be understood that the functionality provided in the method 600 can be distributed between the electronic processor 410 and the panel electronic processor 460 in various configurations. Additional electronic processor may also be included in the portable communications device 100 that perform all or a portion of the method 600. Also, in some embodiments, the functionality provided in the method 600 is performed by a single electronic processor (e.g., electronic processor 410).

The method 600 includes receiving an incoming audio message (at block 610) and determining whether the panel 110 is in the first position or the second position (block 620). Various techniques may be used to detect movement of the panel 110. For example, the electronic processor 410 of the portable communications device 100 may monitor the contact 140 to determine whether the panel 110 is in the first position or o the second position (e.g., detect movement of the panel 110 from the first position to the second position). For example, the electronic processor 410 may detect that the panel 110 is in the second position when the electronic processor 410 determines that the contact 140 is in contact with the inner contact 150 of the panel 110. In other embodiments, the panel electronic processor 460 detects that the panel 110 is in the second position when the panel electronic processor 460 receives power through the inner contact 150 (when the inner contact 150 is engaged with the contact 140). Other mechanisms, both electrical and mechanical in nature, could also be used to determine the position of the panel 110.

When the panel 110 is in the second position, the audio output interface 120 (e.g., the speaker) may be muted (at block 630). In some embodiments, all audio functions of the portable communications device 100 are disabled when the audio output interface 120 is muted. However, in other embodiments, only a subset of the audio functions is disabled when the audio output interface 120 is muted. When the audio output interface 120 is muted, however, the portable communications device 100 still receives audio messages. It should be understood that the position of the panel 110 may be determined when an audio message is received. In other embodiments, the position of the panel 110 may be monitored without regard to whether an audio message has been received. Also, in some embodiments, the audio output interface 120 is not muted based on the position of the panel 110. For example, in some embodiments, the audio output interface 120 remains unmuted even when the panel 110 is in the second position. However, as described above, incoming audio messages are converted to a visual message rather than being played through the audio output interface 120.

As illustrated in FIG. 6, when an audio message is received (e.g., from a base command station or another portable communications device) and the panel 110 is in the second position, the audio message is converted into a visual message (e.g., text) (at block 640). As noted above, in some embodiments, the visual message is a canned message. In other embodiments, the visual message is a voice-to-text conversion of the audio message. Several known techniques are available to convert audio into visual messages. As noted above, in some embodiments, the electronic processor 410 converts a received audio message into a visual message. However, in other embodiments, the panel electronic processor 460 converts a received audio message into a visual message. For example, in some embodiments, the panel electronic processor 460 is specialized to convert audio data into visual data (e.g., text data).

The generated visual message is then displayed on the display 145 of the panel 110 as shown in FIG. 3B (at block 650). Alternatively or in combination, the text may be displayed on a separate display (for example, a static display or touch screen) of the portable communications device 100. In some embodiments, the audio message is also stored (e.g., to the memory 420, the panel memory 470, or a combination thereof). Accordingly, an audio message received when the audio output interface 120 was muted can be later retrieved and output (e.g. played) through the audio output interface 120 (e.g., in response to user input received through an input interface of the portable communications device 100).

As illustrated in FIG. 6, when an audio message is received (at block 610) and the panel 110 is in the first position (at block 620), the audio message is played through the audio output interface 120 (at block 660). Also, when the audio output interface 120 was previously muted, the audio output interface 120 is also unmuted before playing the audio message (at block 670). However, as noted above, in some embodiments, the display 145 only displays a visual message based on a received audio message when the audio output interface 120 is muted (i.e., when the panel 110 is in the second position).

Figure 7:
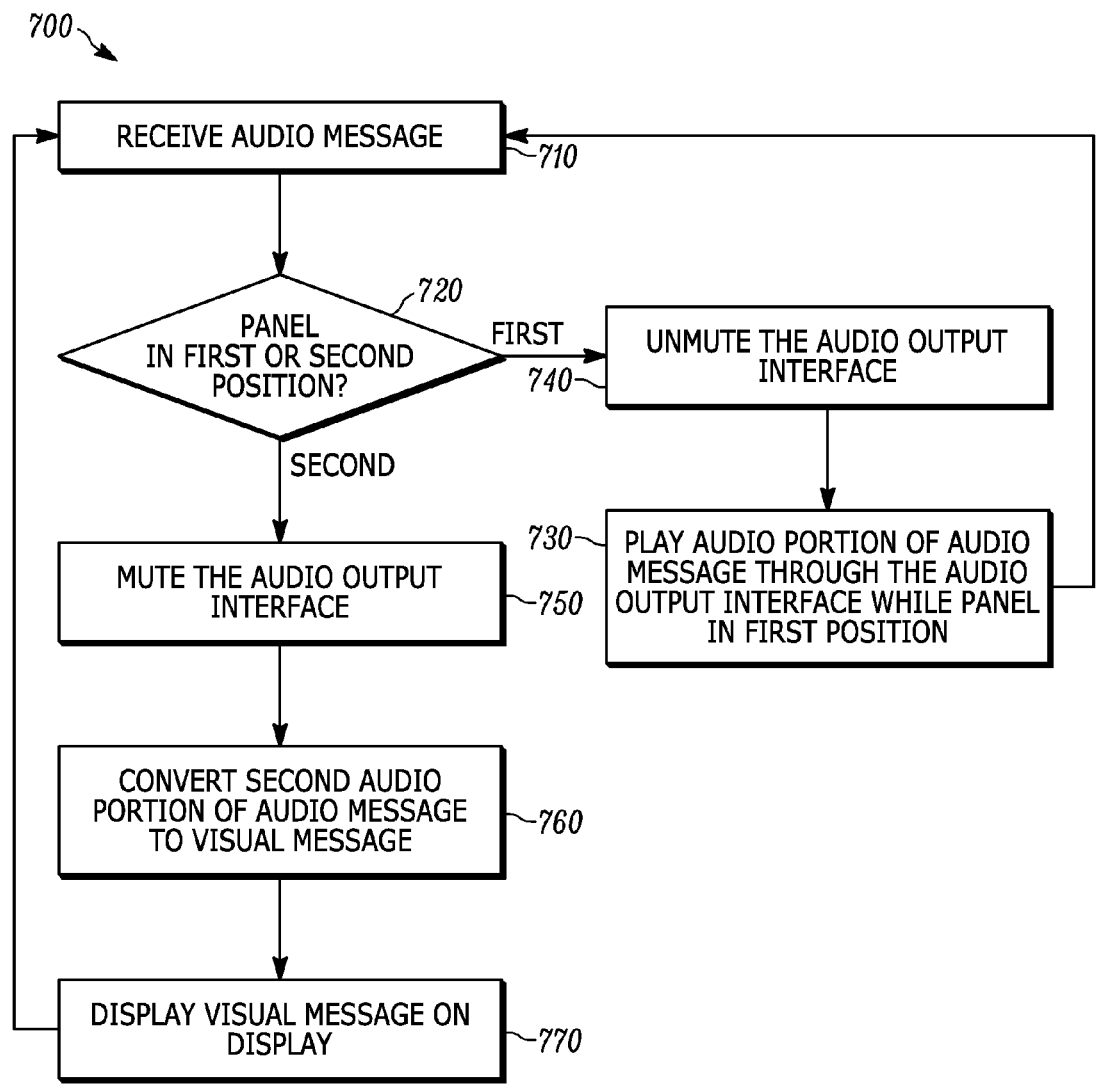
FIG. 7 is a flowchart illustrating a method of muting a portable communications device while playing an audio message in accordance with some embodiments.

FIG. 7 is a flowchart illustrating a method 700 for muting a portable communications device 100 during receipt of an audio message. For example, as described in more detail below, in some embodiments, when the panel 110 is moved during receipt of an incoming audio message, a first portion of the audio message may be played through the audio output interface 120 and a second portion of the audio message may be converted to a visual message displayed on the display 145. Although the method 700 is described in conjunction with the portable communications device 100 as described in the present application, the method 700 could be used with other systems or devices. In addition, the method 700 may be modified or performed differently than the specific example provided.

The method 700 is performed by the portable communications device 100 (i.e., the electronic processor 410, the panel electronic processor 460, or a combination thereof). It should also be understood that the functionality provided in the method 700 can be distributed between the electronic processor 410 and the panel electronic processor 460 in various configurations. Additional electronic processor may also be included in the portable communications device 100 that perform all or a portion of the method 700. Also, in some embodiments, the functionality provided in the method 700 is performed by a single electronic processor (e.g., electronic processor 410).

As illustrated in FIG. 7, the method 700 includes receiving an incoming audio message (at block 710) and detecting whether the panel 110 is in the first position or the second position (at block 720). As noted above, various techniques may be used to detect the position of the panel 110. As also noted above, the position of the panel 110 may be determined when an audio message is received or may be determined regardless of whether an audio message is received (e.g., repeatedly determined).

While the panel 110 is in the first position, a first audio portion of the audio message is output through the audio output interface 120 (at block 730). In addition, as illustrated in FIG. 7, the audio output interface 120 is also unmuted as necessary prior to playing the first audio portion of the audio message (at block 740).

However, as illustrated in FIG. 7, when the panel 110 is moved to the second position while the first audio message is being played (i.e., movement of the panel 110 from the first position to the second position is detected), the audio output interface 120 may be muted (at block 750) and a second, un-played audio portion of the audio message is converted into a visual message (e.g., text message) as described above with respect to method 600 (at block 760) and is output on the display 145 of the panel 110 (at block 770). As noted above, in other embodiments, the visual message may be displayed on separate display (e.g., a static display or touch screen) of the portable communications device 100. Alternatively, if the panel 110 is initially in the second position (at block 720) when the audio message is received (at block 710), a portion of the audio message is converted to a visual message (at block 760) and displayed on the display 145 (at block 770) while the panel 110 is in the second position. However, if the panel 110 subsequently is moved to the first position (at block 720), a subsequent (e.g., remaining) portion of the audio message is played through the audio output interface 120 (at block 730).

It should also be understood that the method 700 can be repeatedly applied as the panel 110 moves between the first and second positions during receipt of an incoming audio message. Accordingly, while the panel 110 is in the first position, audio data of an incoming audio message is played through the audio output interface 120, and while the panel 110 is in the second position, audio data of an incoming audio message is converted to a visual message for display on the display 145. Also, in some embodiments, when the panel 110 is moved to the first position during receipt of an incoming audio message, the entire audio message is played through the audio output interface 120 even if a portion of the message was previously converted to a visual message.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of muting an audio output interface of a portable communications device, the portable communications device having a panel with a display, the panel movable between a first position and a second position, the method comprising:
   receiving an audio message;
   determining whether the panel is in a first position or a second position;
   converting an audio portion of the audio message to a visual message with an electronic processor when the panel is in the second position; and
   displaying the visual message on the display of the panel.

2. The method of claim 1, further comprising muting the audio output interface of the portable communications device when the panel is in the second position.

3. The method of claim 2, further comprising unmuting the audio output interface when the panel is in the first position.

4. The method of claim 1, further comprising playing the audio message through the audio output interface when the panel is in the first position.

5. The method of claim 1, further comprising:
   receiving a second audio message when the panel is in the first position;
   playing a first audio portion of the second audio message through the audio output interface of the portable communications device while the panel is in the first position;
   when the panel is moved to the second position while the first audio portion is played through the audio output interface, converting a second audio portion of the second audio message into a visual message; and
   displaying the visual message on the display of the panel.

6. The method of claim 1, further comprising activating the display of the panel when the panel is moved to the second position.

7. The method of claim 6, further comprising deactivating the display of the panel when the panel is moved to the first position.

8. The method of claim 1, further comprising storing the visual message in a memory.

9. A portable communications device, comprising:
   a receiver to receive an incoming audio message;
   a panel having a display, wherein the panel is movable between a first position and a second position;
   an electronic processor; and
   a memory storing instructions that, when executed by the electronic processor, perform a set of functions comprising:
      determining whether the panel is in a first position or a second position,
      converting an audio portion of the incoming audio message to a visual message when the panel is in the second position; and
      displaying the visual message on the display of the panel.

10. The portable communications device of claim 9, wherein the memory further comprises instructions that, when executed by the electronic processor, mute an audio output interface of the portable communications device when the panel is in the second position.

11. The portable communications device of claim 9, wherein the panel at least partially covers an audio output interface of the portable communications device when the panel is in the second position.

12. The portable communications device of claim 9, further comprising a contact, wherein the display of the panel is electrically connected to the contact when the panel is in the second position and receives electrical power through the contact from a power source internal to the portable communications device.

13. The portable communications device of claim 9, wherein the memory further stores the incoming audio message received by the portable communications device.

14. The portable communications device of claim 9, wherein the panel further comprises:
   a printed circuit board assembly; and
   an integrated circuit communicating with the electronic processor and the printed circuit board assembly,
   wherein the display is coupled to the printed circuit board assembly.

15. The portable communications device of claim 9, wherein the panel further comprises a second memory storing the incoming audio message received by the portable communications device.

16. The portable communications device of claim 9, wherein the visual message is a text message.

17. The portable communications device of claim 9, wherein the display of the panel is activated when the panel is in the second position.

18. The portable communications device of claim 9, wherein the memory further comprises instructions that, when executed by the electronic processor, play the incoming audio message through an audio output interface of the portable communications device when the panel is in the first position.

19. A method of outputting an incoming audio message received at portable communications device, the portable communications device having a panel with a display, the panel movable between a first position and a second position, the method comprising:
- receiving the incoming audio message;
- determining whether the panel is in a first position or a second position;
- while the panel is in the first position, playing audio data of the incoming audio message through an audio output interface of the portable communications devices; and
- while the panel is in the second position, converting audio data of the incoming audio message to a visual message and displaying the visual message on the display.

* * * * *